UNITED STATES PATENT OFFICE.

ADELAIDE M. HAYWARD, OF BOSTON, MASSACHUSETTS.

SOAP-DISH.

SPECIFICATION forming part of Letters Patent No. 337,153, dated March 2, 1886.

Application filed May 1, 1884. Serial No. 129,922. (No model.)

*To all whom it may concern:*

Be it known that I, ADELAIDE M. HAYWARD, a citizen of the United States, residing at Boston, in the county of Suffolk and Commonwealth of Massachusetts, have invented certain new and useful Improvements in Soap-Dishes, of which the following is a specification.

My invention relates to soap-dishes, preferably formed of wire; and it consists in the means hereinafter described of attaching them to the rim of a vessel.

In the accompanying drawings, Figure 1 is an isometric view of my improved soap-dish attached to the top rail or rim of a bath-tub, on the inside of the tub, only a portion of the side of the tub being shown; Fig. 2, an isometric view of a part of a tub or pail having curved sides with a soap-dish attached thereto; Fig. 3, an end elevation of the dish shown in Fig. 2, detached; Fig. 4, an end elevation of the dish shown in Fig. 1, detached.

The soap dish or basket A is preferably made of wires $a$ interlaced, as shown, and attached at their upper ends to the stout wires $a'$ $a^2$, which form the rim of the basket, by loops $a^3$. The wire $a'$, which forms the rim of the front, side, and ends of the dish or basket, is bent upward at $a^4$ at the back side of the basket for some distance, and then bent backward into hooks $a^5$ $a^6$, by which the basket is suspended from the rim of a vessel, as shown in Figs. 1 and 2, the shape of the hooks varying somewhat, according to the shape and thickness of the rim of the vessel to which the basket is to be attached. Thus the hooks $a^5$ in Figs. 2 and 3 are of a shape to receive the thin rim of a tub or pail, C, while the hooks $a^6$ (shown in Figs. 1 and 4) are of a shape to receive the broader rim of a bath-tub, B. It is not, however, necessary to make the hooks in the first instance to fit exactly the rim of the vessel to which they are to be applied, because the hooks are constructed of flexible wire, and may be brought nearer to or farther from the back of the basket, as shown in Fig. 1, where the hooks $a^6$, being originally made to stand at right angles to the back of the basket, as shown in dotted lines, their shanks are bent toward each other to cause them to fit the rim of the tub B. In either case the basket will be held in a nearly horizontal position.

The wire $a^2$, which forms the rim of the back side of the basket or dish A, is joined by loops $a^7$ $a^7$ to the wire $a'$, and may be either straight, as in Figs. 1 and 4, or curved, as in Figs. 2 and 3, to fit the inside of the vessel to which the basket or dish is to be attached.

It will be seen that the soap-dish above described is readily attached to and detached from the vessel with which it may be used, and that, being of open wire-work, it will not allow the water to stand in it and unnecessarily dissolve the soap, and that its use will tend to correct the wasteful habit of servants and others of allowing the soap to lie in the water while washing floors and bathing.

I claim as my invention—

1. A soap-dish formed of interlaced wires and having one side shaped to conform to the inner face of the side of a pail, tub, or other vessel, and provided with hooks to engage with the rim of such vessel, said hooks having flexible shanks, which may be bent sidewise to bring said hooks nearer to the back of said dish, as and for the purpose specified.

2. A soap-dish formed of interlaced wires and having a top rim formed of two wires, one of which extends along the front and ends thereof and has its ends bent into flexible hooks for attaching said dish to a pail or other vessel, and the other of which wires forms the back of the rim of said dish and is bent to conform to the inner face of the side of such pail or vessel, and has its ends looped about said first-named wire, substantially as described, and for the purpose specified.

ADELAIDE M. HAYWARD.

Witnesses:
ALBERT M. MOORE,
EDWARD W. THOMPSON.

(No Model.)
J. HEATH.
FILTERING DEVICE FOR FEED WATER PIPES.
No. 337,154. Patented Mar. 2, 1886.
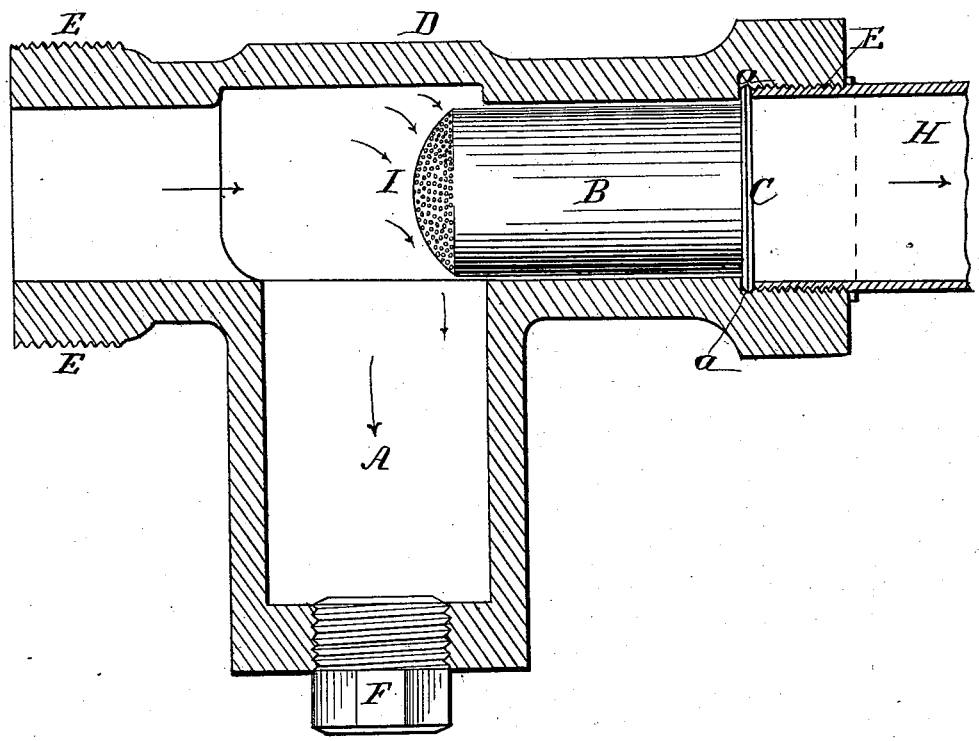
WITNESSES
R. E. Grant
Van Buren Hillyard
INVENTOR
John Heath
by Johnson & Johnson
Attorneys